United States Patent
Kokomoto (10) Patent No.: US 10,554,839 B2
(45) Date of Patent: Feb. 4, 2020

(54) IMAGE FORMING APPARATUS

(71) Applicant: KYOCERA Document Solutions Inc., Osaka (JP)

(72) Inventor: Mari Kokomoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/281,422

(22) Filed: Feb. 21, 2019

(65) Prior Publication Data

US 2019/0268491 A1   Aug. 29, 2019

(30) Foreign Application Priority Data

Feb. 26, 2018   (JP) .................................. 2018-032414

(51) Int. Cl.
*G06F 3/12*   (2006.01)
*H04N 1/00*   (2006.01)

(52) U.S. Cl.
CPC ..... *H04N 1/00896* (2013.01); *H04N 1/00034* (2013.01); *H04N 1/00037* (2013.01); *H04N 1/00082* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2012/0008156 A1* | 1/2012 | Peng | H04N 1/1013 358/1.13 |
| 2012/0218597 A1* | 8/2012 | Hashimoto | G03G 15/5004 358/1.15 |
| 2013/0182272 A1* | 7/2013 | Lim | H04N 1/00888 358/1.13 |
| 2015/0009518 A1* | 1/2015 | Kashiwagi | H04N 1/00708 358/1.13 |
| 2015/0036183 A1* | 2/2015 | Igarashi | G06F 3/1221 358/1.15 |
| 2018/0246687 A1* | 8/2018 | Nishio | G06F 3/1229 |

FOREIGN PATENT DOCUMENTS

JP   2007-057606 A   3/2007

\* cited by examiner

*Primary Examiner* — Henok Shiferaw
(74) *Attorney, Agent, or Firm* — IP Business Solutions, LLC (57) ABSTRACT

An image forming apparatus includes a document reading section, an image formation section, a request reception section, a control section, a mode shift section, a determination section, and a setting reception section. In a case where a user's silent mode setting has been received by the setting reception section, the mode shift section shifts the image forming apparatus to a standby mode with no standby time after an ending of a copying performed by the image formation section. In contrast, even when the user's silent mode setting has been received by the setting reception section, in a case where it is determined by the determination section that the copying is a copying intended for a spread document, the mode shift section shifts the image forming apparatus to the standby mode upon passage of a predefined standby time while the image forming apparatus is kept unoperated.

9 Claims, 4 Drawing Sheets

IMAGE FORMING APPARATUS

INCORPORATION BY REFERENCE

This application claims priority to Japanese Patent Application No. 2018-032414 filed on Feb. 26, 2018, the entire contents of which are incorporated by reference herein.

BACKGROUND

This disclosure relates to an image forming apparatus and more specifically to a technology of shifting to a standby mode.

Some image forming apparatuses have a standby mode in which start of image formation is awaited. For example, upon shifting to the standby mode, four transfer rollers are separated from photosensitive drums (switching from a four-color-pressed state to a four-color-separated state is made) to thereby suppress deterioration of the photosensitive drums, etc. and a rotation speed of a polygon motor is reduced or stopped to thereby realize energy saving. Moreover, upon the reduction or stopping of the rotation speed of the polygon motor, operation sound of the apparatus is reduced.

Shifting to the standby mode occurs upon passage of predefined standby time (for example, one minute) while the image forming apparatus is kept unoperated. For example, upon passage of one minute while the image forming apparatus is kept unoperated after ending of copying, shifting to the standby mode occurs, reducing the operation sound of the apparatus.

Moreover, some image forming apparatuses have a function of a silent mode which can be set in a desired manner by a user. Then in a case where the silent mode is set, upon the ending of copying, standby time is omitted (that is, without waiting for passage of one minute) and shifting to the standby mode occurs. As a result, the operation sound of the polygon motor can be reduced immediately after the ending of the copying.

Moreover, the switching to the four-color separated state is also performed immediately after the ending of the copying, and thus a driving sound is also generated upon the switching to the four-color-separated state immediately after the ending of the copying, thus making it possible to realize a more silent image forming apparatus thereafter.

SUMMARY

A technology obtained by further improving the technology described above will be suggested as one aspect of this disclosure.

An image forming apparatus according to one aspect of this disclosure includes a document reading section, an image formation section, a request reception section, a control section, a mode shift section, a determination section, and a setting reception section. The document reading section reads a document loaded on a document loading surface. The image formation section forms an image on a recording medium based on image data of the document obtained through the reading performed by the document reading section. The request reception section receives from a user, a request for copying the document. The control section controls operation of the document reading section and the image formation section to execute the copying of the document when the request for copying the document is received by the request reception section. Upon passage of a predefined first standby time while the image forming apparatus is kept unoperated after an ending of the copying performed by the image formation section, the mode shift section shifts the image forming apparatus to a standby mode in which start of image formation is awaited. The determination section determines whether or not the copying is intended for a spread document. The setting reception section receives a silent mode setting from the user. In a case where the user's silent mode setting has not been received by the setting reception section, the mode shift section shifts the image forming apparatus to the standby mode upon passage of the first standby time after the ending of the copying performed by the image formation section. In the case where the user's silent mode setting has been received by the setting reception section, the mode shift section shifts the image forming apparatus to the standby mode with no standby time after the ending of the copying performed by the image formation section. Even when the user's silent mode setting has been received by the setting reception section, in a case where it is determined by the determination section that the copying is the copying intended for the spread document, to shift the image forming apparatus to the standby mode upon passage of a predefined second standby time while the image forming apparatus is kept unoperated.

DETAILED DESCRIPTION

Figure 1:
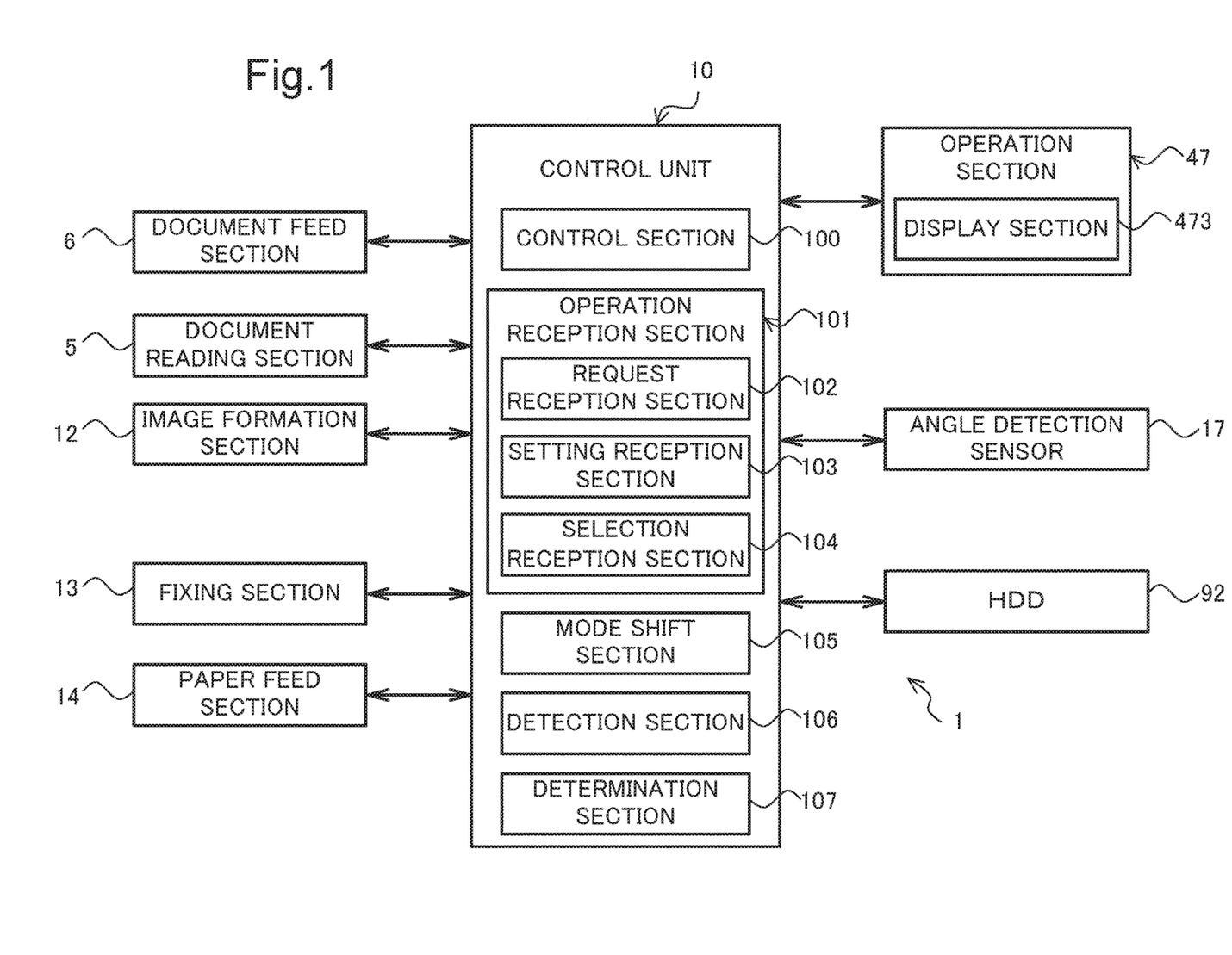
FIG. 1 is a functional block diagram schematically illustrating main inner configuration of an image forming apparatus according to a first embodiment of this disclosure.
Figure 2:
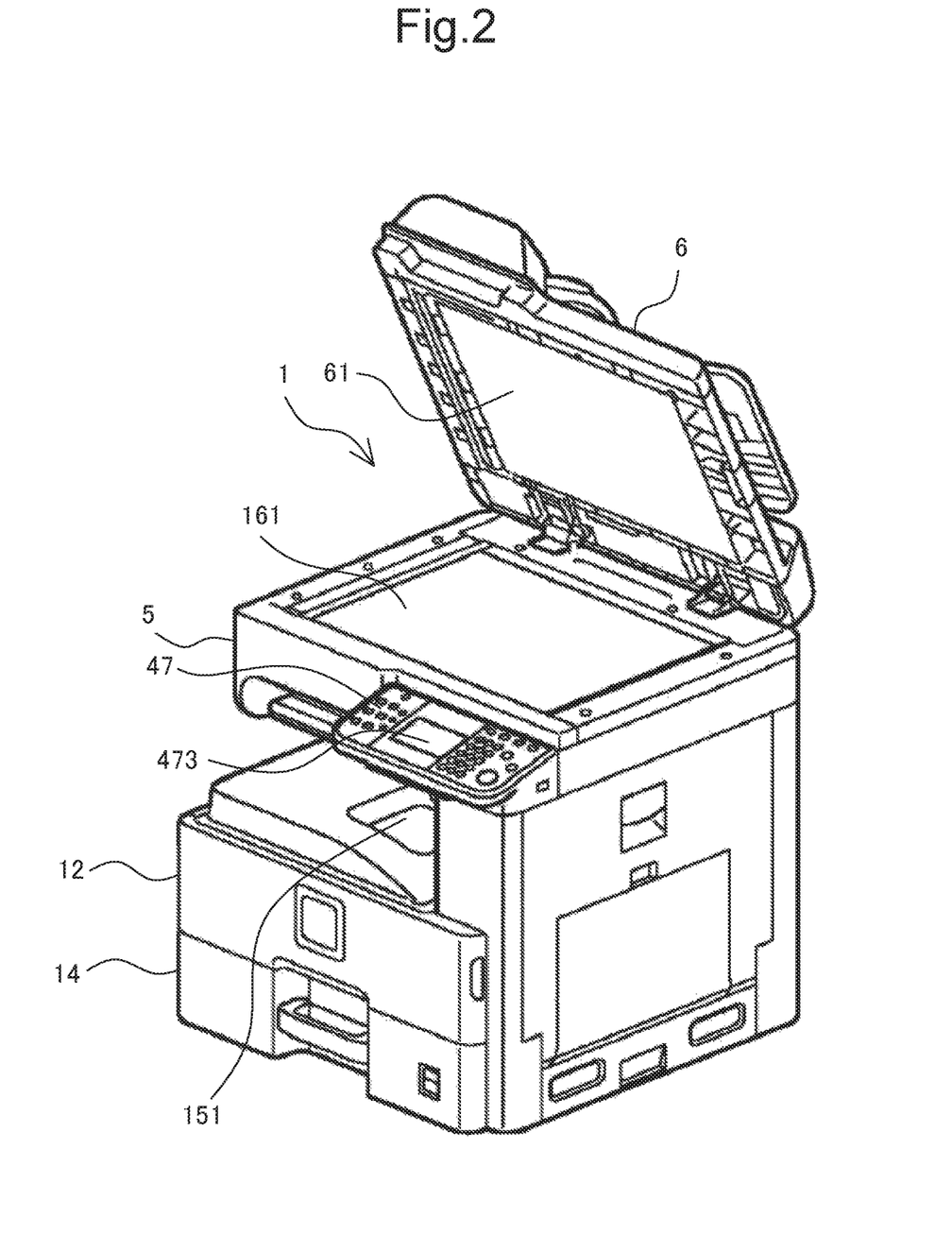
FIG. 2 is a perspective view illustrating the outer appearance of the image forming apparatus according to the first embodiment.

Hereinafter, an image forming apparatus according to one embodiment of this disclosure will be described with reference to the drawings. FIG. 1 is a functional block diagram schematically illustrating main inner configuration of the image forming apparatus according to a first embodiment of this disclosure. FIG. 2 is a perspective view illustrating the outer appearance of the image forming apparatus according to the first embodiment.

The image forming apparatus 1 is a multifunction peripheral combining a plurality of functions such as, for example, a copy function, a printer function, a scanner function, and a facsimile function. The image forming apparatus 1 includes a control unit 10, a document feed section 6, a document reading section 5, an image formation section 12, a fixing section 13, a paper feed section 14, and an operation section 47.

A case where document reading operation is performed in the image forming apparatus 1 will be described. The document reading section 5 optically reads an image of a document conveyed by the document feed section 6 or a document loaded on contact glass 161 and then generates image data. The image data generated by the document reading section 5 is saved into, for example, an image memory, not illustrated. Note that the contact glass 161 is one example of a document loading surface in the scope of the claims.

The document feed section 6 is formed on a top surface of the document reading section 5 with a hinge or the like in an openable and closeable manner. The document feed section 6 includes a document mat 61 as a white plate on a rear surface thereof, and functions as a document press cover upon reading of the document loaded on the contact glass 161. The document mat 61 is supported at an apparatus body of the image forming apparatus 1 in a manner such as to be openable and closeable with respect to the contact glass 161 serving as the document loading surface. Note that the document mat 61 is one example of a document press member in the scope of the claims.

The document reading section 5 has a light source which emits light towards the document loaded on the contact glass 161 and receives light reflected from the document to thereby read an image of the document.

A case where image formation operation is performed in the image forming apparatus 1 will be described. Based on, for example, the image data generated through the document reading operation or image data received from a computer serving as an external device connected to a network, the image formation section 12 forms a toner image on recording paper serving as a recording medium fed from the paper feed section 14.

The fixing section 13 fixes the toner image on the recording paper through thermal compression, and the recording paper subjected to fixing processing is discharged onto a discharge tray 151. The paper feed section 14 includes a paper feed cassette.

The operation section 47 receives, from an operator for various types of operation and processing executable by the image forming apparatus 1, instructions such as an image formation operation execution instruction. The operation section 47 includes a display section 473 which displays, for example, an operation guide to the operator. The display section 473 is a touch panel, and the operator can touch a button or a key displayed on a screen to operate the image forming apparatus 1.

The control unit 10 includes a processor, a random-access memory (RAM), a read only memory (ROM), and a dedicated hardware circuit. The processor is, for example, a central processing unit (CPU), an application specific integrated circuit (ASIC), or a micro-processing unit (MPU). The control unit 10 includes a control section 100, an operation reception section 101, a mode shift section 105, a detection section 106, and a determination section 107.

Through operation of the aforementioned processor in accordance with a control program stored in a hard disk drive (HDD) 92, the control unit 10 functions as the control section 100, the operation reception section 101, the mode shift section 105, the detection section 106, and the determination section 107. However, the control section 100, etc. can each be formed by a hardware circuit without depending on operation performed in accordance with the control program by the control unit 10. Hereinafter, the same applies to each embodiment unless otherwise is specified.

The control section 100 is in charge of overall operation control of the image forming apparatus 1. The control section 100 is connected to the document feed section 6, the document reading section 5, the image formation section 12, the fixing section 13, the paper feed section 14, and the operation section 47 and performs, for example, driving control of each of these sections. For example, upon reception of an instruction for executing the function included in the image forming apparatus 1 by the operation reception section 101, the control section 100 executes the function which the instruction for executing has been provided.

The operation reception section 101 receives operation input from a user via the operation section 47. Moreover, the operation reception section 101 includes a request reception section 102, a setting reception section 103, and a selection reception section 104.

The request reception section 102 receives a document copy request from the user. The setting reception section 103 receives a silent mode setting from the user. For example, upon reception of the document copy request by the request reception section 102, the control section 100 controls operation of the document reading section 5 and the image formation section 12 to execute the document copying.

The selection reception section 104 receives, from the user, a selection such that the document is a spread document. Note that the selection reception section 104 can substitute an existing selection reception section which receives a user selection of a function of dividing each single page on a right and a left for copying.

The mode shift section 105 performs processing of switching an operation mode of the image forming apparatus 1. For example, upon passage of predefined first standby time T1 (for example, one minute) while the image forming apparatus 1 is kept unoperated after ending of the copying performed by the image formation section 12 in a state in which the user's silent mode setting has not been received by the setting reception section 103, the mode shift section 105 shifts the image forming apparatus 1 to a standby mode in which start of image formation is awaited.

Moreover, in a case where the user's silent mode setting has not been received by the setting reception section 103, the mode shift section 105 shifts the image forming apparatus 1 to the standby mode without providing standby time after the ending of the copying performed by the image formation section 12.

Further, even if the user's silent mode setting has been received by the setting reception section 103, upon determination by the determination section 107, to be described later on, that the copying is intended for the spread document, the mode shift section 105 shifts the image forming apparatus 1 to the standby mode upon passage of predefined second standby time T2 (for example, 10 seconds) while the image forming apparatus 1 is kept unoperated.

The detection section 106 detects an inclination angle of the document mat 61, which plays a role as a document press member, with respect to the contact glass 161. An angle detection sensor 17 which detects the aforementioned inclination angle is arranged near a hinge serving as a rotation shaft of the document mat 61, and inclination angle information detected by the angle detection sensor 17 is outputted to the control unit 10. For example, a variable resistor is coupled as the angle detection sensor 17 to the rotation shaft, and a resistance value of the variable resistor which varies in accordance with the inclination angle of the document mat 61 with respect to the contact glass 161 is outputted as the inclination angle information to the control unit 10.

The determination section 107 determines whether or not the copying is intended for the spread document (for example, copying with a book or a magazine spread). Note that, for example, three methods below are listed as examples of a method of the aforementioned determination.

<Method 1>

Upon the copying with the book or the magazine spread, a black band-like image appears at a central portion of the document due to floating of the aforementioned central portion. That is, in a case where the black image is present at the central portion of the document, it can be said that the document is a spread document of the book or the magazine.

Thus, based on the image data of the document obtained through the reading performed by the document reading section 5, the determination section 107 determines, from presence or absence of the black image that appears at the central portion when the document is a spread document, whether or not the copying is intended for the spread document. For example, the determination section 107 analyzes this image data to thereby calculate coordinate data corresponding to four apexes as outer edge parts of the document and specify a region of the central portion of the document from the coordinate data corresponding to the calculated four apexes and also calculate a size of the document. Then in a case where at least a predefined ratio of the black image at the specified central portion with respect to the size of the document is present, the determination section 107 determines that the copying is intended for the spread document.

<Method 2>

In a case where the selection reception section 104 has received the user selection such that the document is a spread document, the determination section 107 determines that the copying is intended for the spread document.

<Method 3>

Upon the copying with the book or the magazine spread, due to a thickness of the document or the floating of the central portion, the document mat 61 cannot completely be closed. That is, in a case where the document mat 61 is not completely closed, it can be said that the document is a spread document of the book or the magazine.

Thus, upon determination based on results of the detection performed by the detection section 106 that the inclination angle of the document mat 61 with respect to the contact glass 161 is equal to or greater than a predefined value, the determination section 107 determines that the copying is intended for the spread document.

Figure 3:
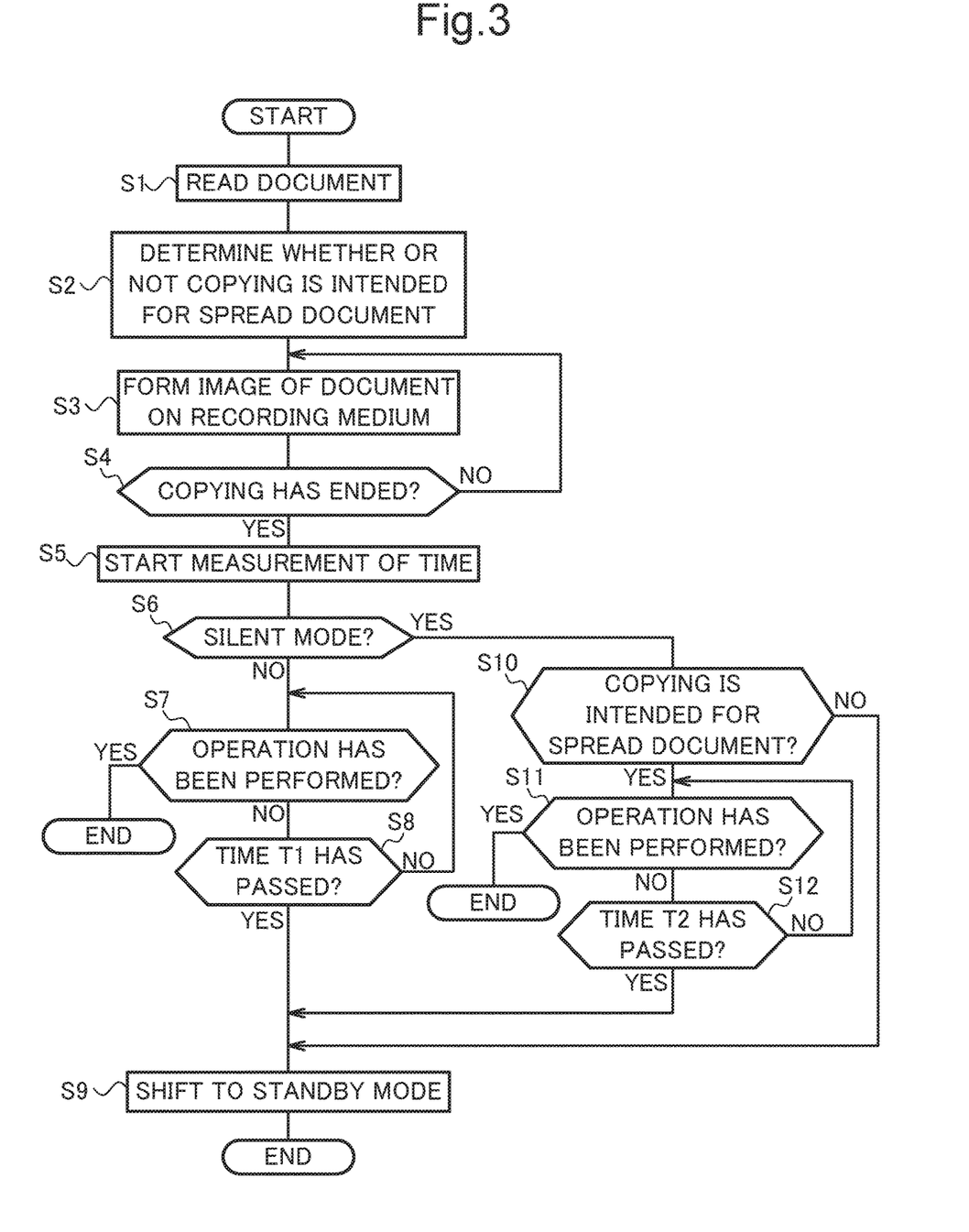
FIG. 3 is a flowchart illustrating one example of processing operation performed in a control unit of the image forming apparatus according to the first embodiment.

Next, one example of processing operation performed in the control unit 10 of the image forming apparatus 1 according to the first embodiment will be described based on a flowchart illustrated in FIG. 3.

Upon reception of the document copy request by the request reception section 102, the control section 100 controls operation of the document reading section 5, thereby causing the document reading section 5 to read the image of the document loaded on the contact glass 161 (S1). Then the determination section 107 determines whether or not the copying is intended for the spread document (S2).

After completion of the document reading performed by the document reading section 5, the control section 100 controls operation of the image formation section 12, thereby causing the image formation section 12 to form the image on the recording medium based on the image data obtained through the reading performed by the document reading section 5 to execute the copying (S3).

The mode shift section 105 judges whether or not the copying performed by the image formation section 12 has ended (S4), and upon judgment by the mode shift section 105 that the copying performed by the image formation section 12 has not yet ended (NO in S4), the processing returns to S3.

On the other hand, upon judgment that the copying performed by the image formation section 12 has ended (YES in S4), the mode shift section 105 starts, by use of a timer built in the control unit 10, measurement of passage time from a time point at which the copying performed by the image formation section 12 has ended (S5), and then judges whether or not the user's silent mode setting has been received by the setting reception section 103 (S6).

Upon judgment that the user's silent mode setting has not been received by the setting reception section 103 (NO in S6), the mode shift section 105 judges whether or not user operation has been received by the operation reception section 101 (S7).

Then upon judgment that the user operation has not been received by the operation reception section 101 (NO in S7), the mode shift section 105 judges whether or not the predefined first standby time T1 (for example, one minute) has passed since the ending of the copying performed by the image formation section 12 (S8). That is, the mode shift section 105 judges whether or not the first standby time T1 has passed while the image forming apparatus 1 is kept unoperated after the ending of the copying performed by the image formation section 12.

Upon judgment that the first standby time T1 has passed since the ending of the copying performed by the image formation section 12 (YES in S8), the mode shift section 105 shifts the image forming apparatus 1 to the standby mode (S9). Then the processing ends. Upon the shift of the image forming apparatus 1 to the standby mode, the control section 100, for example, separates the four transfer rollers from the photosensitive drums or reduces or stops a rotation speed of the polygon motor.

On the other hand, upon judgment by the mode shift section 105 that the first standby time T1 has not passed since the ending of the copying performed by the image formation section 12 (NO in S8), the processing returns to S7. Moreover, upon judgment by the mode shift section 105 that the user operation has been received by the operation reception section 101 before the passage of the first standby time T1 (NO in S8 and YES in S7), the processing ends. That is, the control section 100, etc. causes the image forming apparatus 1 to perform operation in accordance with the instruction indicated by the aforementioned user operation.

Moreover, upon judgment by the mode shift section 105 in S6 that the user's silent mode setting has been received by the setting reception section 103 (YES in S6), the determination section 107 judges in S2 described above whether or not the copying is intended for the spread document (S10).

Upon determination by the determination section 107 that the copying is not intended for the spread document (NO in S10), the mode shift section 105 shifts the image forming apparatus 1 to the standby mode without providing standby time (S9). Then the processing ends.

On the other hand, upon determination by the determination section 107 that the copying is intended for the spread document (YES in S10), the mode shift section 105 judges whether or not the user operation has been received by the operation reception section 101 (S11).

Then upon judgement that the user operation has not been received by the operation reception section 101 (NO in S11), the mode shift section 105 judges whether or not the predefined second standby time T2 (for example, ten seconds) has passed since the ending of the copying performed by the image formation section 12 (S12). That is, the mode shift section 105 judges whether or not the second standby time T2 has passed while the image forming apparatus 1 is kept unoperated after the ending of the copying performed by the image formation section 12.

Upon judgment that the second standby time T2 has passed since the ending of the copying performed by the image formation section 12 (YES in S12), the mode shift section 105 shifts the image forming apparatus 1 to the standby mode (S9). Then the processing ends.

On the other hand, upon judgment that the second standby time T2 has not passed since the ending of the copying performed by the image formation section 12 (NO in S12), the processing returns to S11. Upon judgment by the mode shift section 105 that the user operation has been received by the operation reception section 101 without passage of the second standby time T2 (NO in S12 and YES in S11), the processing ends.

According to the first embodiment described above, even if the silent mode is set, in a case where the copying is intended for the spread document (that is, copying is performed with a book or a magazine spread), the standby time until shift to the standby mode is provided, which can therefore avoid shift to the standby mode before next copying. As a result, even in a case where the silent mode is set, without use of a human body sensor as an expensive device, the silent mode can be released when necessary to efficiently perform copying of a book or a magazine.

In the image forming apparatus described in the background art above, upon reception of a copy request by the image forming apparatus in a state in which shift to the standby mode has occurred, with the four transfer rollers pressed against the photosensitive drums, switching from the four-color-separated state to the four-color-pressed state is made (note that switching to a three-color-separated state is made in case of monochromatic printing) and the rotation speed of the polygon motor is increased to provide a stable state of the apparatus before copy processing is performed.

Upon copying a plurality of pages with a book or a magazine spread, after the copying of the specific page, it is required to search for the page to be printed next time, set the scanner, and press a start button of a copy machine, and thus it is assumed that considerable time passes between copy trials.

Therefore, upon copying the plurality of pages with the book or magazine spread, if the silent mode is set, shift to the silent mode occurs upon every ending of the copying, which requires much time for start of the next copying, deteriorating productivity.

For example, there is an image forming apparatus including a human body detection sensor. This image forming apparatus uses the human body detection sensor to select a standard mode when a human is present around the image forming apparatus and select a silent mode when no human is present around the apparatus.

However, the human body detection sensor is a relatively expensive device, leading to a cost increase. Moreover, there is a risk that, depending on detection accuracy of the human body detection sensor, the silent mode is not selected when the silent mode needs to be selected and shift to the standby mode does not occur at appropriate timing.

On the contrary, in this embodiment, even in a case where the silent mode is set without use of the human body detection sensor, the silent mode can be released when necessary to efficiently copy the book or the magazine.

Moreover, as another embodiment, the second standby time T2 may be changed based on a thickness of the document. It is assumed that a small thickness of the document permits smooth user operation, shortening operation time. Thus, the mode shift section 105 changes the second standby time T2 in accordance with the inclination angle of the document mat 61 with respect to the contact glass 161 and makes the second standby time T2 shorter with a decrease in the aforementioned inclination angle.

For example, in a case where a state in which the document mat 61 is completely closed is defined as condition that the inclination angle of the document mat 61 with respect to the contact glass 161 is set at zero degrees, the mode shift section 105 sets the second standby time T2 at ten seconds as a maximum when the inclination angle is equal to or greater than ten degrees, sets the second standby time T2 at seven seconds when the inclination angle is 5.0 to 9.9 degrees, and sets the second standby time T2 at five seconds when the inclination angle is 0.1 to 4.9 degrees. This consequently can avoid setting the second standby time T2 longer than necessary, thus making it possible to realize quick shift to the standby mode while maintaining productivity of copying a book or a magazine.

Figure 4:
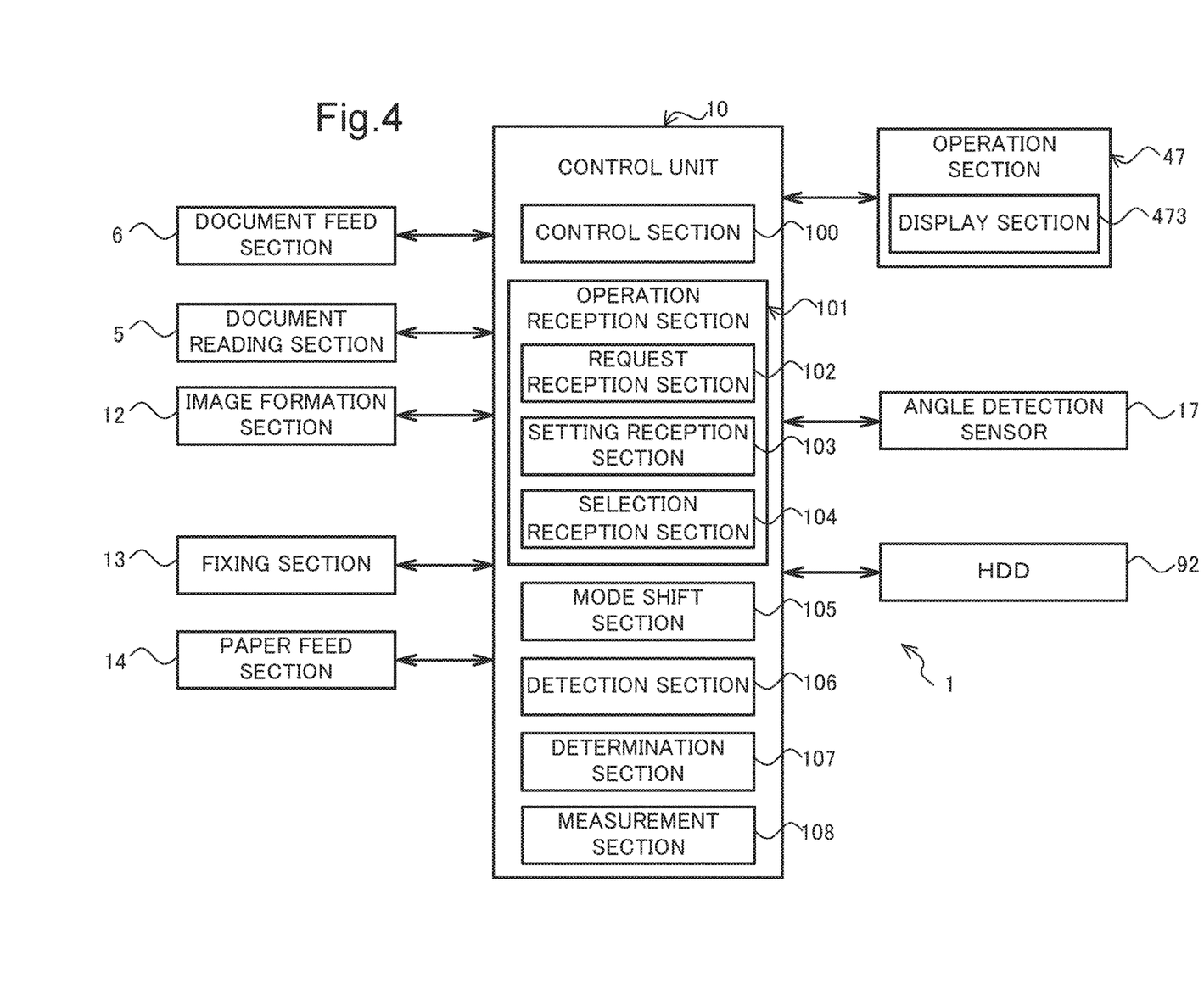
FIG. 4 is a functional block diagram schematically illustrating main inner configuration of an image forming apparatus according to a second embodiment.

FIG. 4 is a functional block diagram schematically illustrating main inner configuration of an image forming apparatus according to a second embodiment. The same configuration as that of the image forming apparatus according to the first embodiment illustrated in FIG. 1 will be omitted from a description. The image forming apparatus according to the second embodiment differs from the image forming apparatus according to the first embodiment illustrated in FIG. 1 in a point that the control unit 10 includes a measurement section 108 and further that the mode shift section 105 changes the second standby time T2 based on time measured by the measurement section 108. As a result of operation of the aforementioned processor in accordance with the control program stored in the HDD 92, the control unit 10 further functions as the measurement section 108 in addition to as the control section 100, the operation reception section 101, the mode shift section 105, the detection section 106, and the determination section 107. Note that, however, the control section 100, etc. can form the measurement section 108 with a hardware circuit without depending on the operation performed in accordance with the control program by the control unit 10.

By use of a timer built-in the control unit 10, the measurement section 108 measures passage time ET from a time point at which the copying performed by the image formation section 12 ends until a request for next copying is received by the request reception section 102.

The mode shift section 105 compares the passage time ET measured by the measurement section 108 with the second standby time T2 and changes the second standby time T2 based on a result of the comparison. Note that following two methods are listed as examples of a method of making the aforementioned change.

<Method 1>

In a case where the passage time ET is equal to or shorter than the second standby time T2 by predefined time A (first time) or more, the mode shift section 105 shortens the second standby time T2 by predefined time B (second time). That is, in a case where the passage time ET is sufficiently shorter than the second standby time T2, the mode shift section 105 shortens the second standby time T2 by given time. Note that it is desirable that the time B (second time) be shorter than the time A (first time).

For example, in a case where a default value of the second standby time T2 is ten seconds, the time A is set at five seconds, and the time B is set at three seconds, upon measurement by the measurement section 108 such that the passage time ET is four seconds (<time A), the mode shift section 105 sets the second standby time T2 at seven seconds (=ten seconds−three seconds).

<Method 2>

In a case where the passage time ET is shorter than the second standby time T2 by predefined time D (third time) or more, the mode shift section 105 changes, to the second standby time T2, time obtained by adding likelihood time E (<the time D> to the passage time ET.

For example, in a case where the default value of the second standby time T2 is set at ten seconds, the time D is set at five seconds, and the likelihood time E is set at two seconds, upon measurement by the measurement section 108 such that the passage time ET is four seconds (<the time D>, the mode shift section 105 sets the second standby time T2 at six seconds (=four seconds+two seconds>.

Consequently, it is possible to avoid the second standby time T2 from becoming longer than necessary, thus permitting realization of quick shift to the standby mode while maintaining the productivity of the copying a book or a magazine.

Moreover, this disclosure is not limited to the configuration of the embodiment described above, and various modification can be made thereto. The embodiment has been described above, referring to a multifunction peripheral as one embodiment of an image forming apparatus according to this disclosure, but this is just one example and, for example, another image forming apparatus having a copy function may be used.

Moreover, the configuration and the processing illustrated in the embodiment described above with reference to FIGS. 1 to 4 are each just one embodiment and this disclosure is not limited in any way to these configurations and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a document reading section reading a document loaded on a document loading surface;
   an image formation section forming an image on a recording medium based on image data of the document obtained through the reading performed by the document reading section;
   a request reception section receiving, from a user, a request for copying the document;
   a control section controlling operation of the document reading section and the image formation section to execute the copying of the document when the request for copying the document is received by the request reception section;
   a mode shift section, upon passage of a predefined first standby time while the image forming apparatus is kept unoperated after an ending of the copying performed by the image formation section, shifting the image forming apparatus to a standby mode in which start of image formation is awaited;
   a determination section determining whether or not the copying is intended for a spread document; and
   a setting reception section receiving a silent mode setting from the user,
   wherein the mode shift section is configured:
   in a case where the user's silent mode setting has not been received by the setting reception section, to shift the image forming apparatus to the standby mode upon passage of the first standby time after the ending of the copying performed by the image formation section,
   in a case where the user's silent mode setting has been received by the setting reception section, to shift the image forming apparatus to the standby mode with no standby time after the ending of the copying performed by the image formation section, and
   even when the user's silent mode setting has been received by the setting reception section, in a case where it is determined by the determination section that the copying is the copying intended for the spread document, to shift the image forming apparatus to the standby mode upon passage of a predefined second standby time while the image forming apparatus is kept unoperated.

2. The image forming apparatus according to claim 1, wherein based on the image data of the document obtained through the reading performed by the document reading section, the determination section determines, from presence or absence of a black image that appears in a central portion of the document when the document is a spread document, whether or not the copying is intended for the spread document.

3. The image forming apparatus according to claim 2, wherein the determination section analyzes the image data to thereby calculate coordinate data corresponding to four apexes as outer edge parts of the document, specifies a region of the central portion of the document from the coordinate data corresponding to the calculated four apexes and also calculates a size of the document, and, in a case where a predefined ratio of the specified black image with respect to the size of the document is present in the specified central portion, determines that the copying is intended for the spread document.

4. The image forming apparatus according to claim 1, further comprising a selection reception section receiving, from the user, selection such that the document is the spread document,
   wherein in a case where the user's selection such that the document is the spread document is been received by the selection reception section, the determination section determines that the copying is intended for the spread document.

5. The image forming apparatus according to claim 1, further comprising:
   a document press member pressing the document loaded on the document loading surface; and
   a detection section detecting an inclination angle of the document press member with respect to the document loading surface,
   wherein upon judgment, based on a result of the detection performed by the detection section, that the inclination angle of the document press member with respect to the document loading surface is equal to or greater than a predefined value, the determination section determines that the copying is intended for the spread document.

6. The image forming apparatus according to claim 5, wherein the mode shift section changes the second standby time in accordance with the inclination angle detected by the detection section and shortens the second standby time with a decrease in the inclination angle.

7. The image forming apparatus according to claim 1, further comprising a measurement section measuring a passage time from a time point at which the copying performed by the image formation section ends until a request for a next copying is received by the request reception section,
   wherein the mode shift section changes the second standby time in accordance with the passage time measured by the measurement section.

8. The image forming apparatus according to claim 7, wherein in a case where the passage time is shorter than the second standby time by a predefined first time or more, the mode shift section shortens the second standby time by a predefined second time shorter than the first standby time.

9. The image forming apparatus according to claim 7, wherein in a case where the passage time is shorter than the second standby time by a predefined third time or more, the mode shift section changes the second standby time to a time obtained by adding, to the passage time, likelihood time shorter than the third time.

\* \* \* \* \*